US007603722B2

(12) United States Patent
Lee et al.

(10) Patent No.: US 7,603,722 B2
(45) Date of Patent: Oct. 13, 2009

(54) SCHEDULED-RECORDING METHOD THAT SCHEDULES RECORDING OF COPY-PROTECTED CONTENT

(75) Inventors: Jae-heung Lee, Suwon-si (KR); Yang-lim Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 11/104,497

(22) Filed: Apr. 13, 2005

(65) Prior Publication Data

US 2005/0238168 A1 Oct. 27, 2005

Related U.S. Application Data

(60) Provisional application No. 60/561,513, filed on Apr. 13, 2004.

(30) Foreign Application Priority Data

May 4, 2004 (KR) ...................... 10-2004-0031338

(51) Int. Cl.
*H04N 7/16* (2006.01)
*G06F 7/04* (2006.01)
(52) U.S. Cl. ......................................... 726/31; 705/57
(58) Field of Classification Search .................... 726/31
See application file for complete search history.

(56) References Cited

U.S. PATENT DOCUMENTS

2003/0118180 A1 6/2003 Shida

2004/0010670 A1* 1/2004 Pelly ........................... 711/164
2004/0062527 A1 4/2004 Kuroda
2005/0125357 A1* 6/2005 Saadat et al. .................. 705/57

FOREIGN PATENT DOCUMENTS

| EP | 0 913 997 A2 | 5/1999 |
| EP | 0913997 A2 | 5/1999 |
| EP | 0938091 A2 | 8/1999 |
| EP | 1 056 288 A2 | 11/2000 |
| EP | 1056288 A2 | 11/2000 |
| EP | 1 058 456 A1 | 12/2000 |
| EP | 1058456 A1 | 12/2000 |
| JP | 2003-331487 A | 11/2003 |

\* cited by examiner

*Primary Examiner*—Brandon S Hoffman
(74) *Attorney, Agent, or Firm*—Sughrue Mion, PLLC (57) ABSTRACT

A scheduled recording method, which schedules recording of copy-protected content, is provided. The scheduled recording method involves determining whether copy control information of content of interest exists in a recording device storing various copy control information; if the copy control information does not exist in the recording device, newly receiving copy control information and then determining whether the copy control information exists among the newly received information; if the copy control information of the content exists in the recording device, determining whether the copy control information "copy never"; and if the copy control information of the content is "copy never", transmitting an error message to a user indicating that the content of interest is not recordable to a user. Accordingly, it is possible to let a user know about whether content is recordable by defining a copy protection status variable and determining whether the content is recordable whenever new copy control information is received.

19 Claims, 5 Drawing Sheets

SCHEDULED-RECORDING METHOD THAT SCHEDULES RECORDING OF COPY-PROTECTED CONTENT

This application claims the priority of Korean Patent Application No. 2004-31338, filed on May 4, 2004, in the Korean Intellectual Property Office, and U.S. Patent Application No. 60/561,513, filed on Apr. 13, 2004, in the U.S. patent and Trademark Office, the disclosures of which are incorporated herein in their entirety by reference.

BACKGROUND OF THE INVENTION

1. Field of the Invention

Apparatuses and methods consistent with the present invention relate to a scheduled recording method, and more particularly, to a scheduled-recording method that schedules recording of content that is copy-protected under digital rights management.

2. Description of the Related Art

In recent years, home networks have received more and more attention from the public. A home network is a network that comprises devices for reproducing content and devices for managing the devices that reproduce content. Additionally, home networks provide digital rights management for content reproduction.

Digital rights management includes a function of managing rights given to each of the apparatuses of the home network and a function of managing rights given to contents which are reproducible on the home network. Digital rights management is performed by application programs installed in the apparatuses of the home network. Recently, several digital rights management application programs, such as SmartRight developed by Thompson, Open Conditional Content Access Management (OCCAM) developed by Cisco, xCP Cluster Protocol developed by IBM, and Digital Transmission Content Protection (DTCP) developed by Digital Transmission License Administration (DTLA), have been suggested.

In a typical digital rights management system, devices constituting a home network are classified into a master device and slave devices. The master device assigns rights to other devices, changes or nullifies the rights given to the other devices, sets rights in content in the home network, or changes or nullifies the rights set in the content. The slave devices are further classified into a media renderer and a media source. The media renderer decodes and then reproduces content. The media source provides the content to the media renderer. Whether a device in the home network is a master device or a slave device is determined depending on the particular functions a digital rights management application program serves.

In a recent home network system, a master device and a slave device communicate with each other by using universal plug and play (uPnP) protocol. The uPnP protocol is a technology that automatically qualifies a device for or disqualifies the device from membership of a home network by automatically recognizing the device and whether or not the device is currently connected to the home network.

Figure 1:
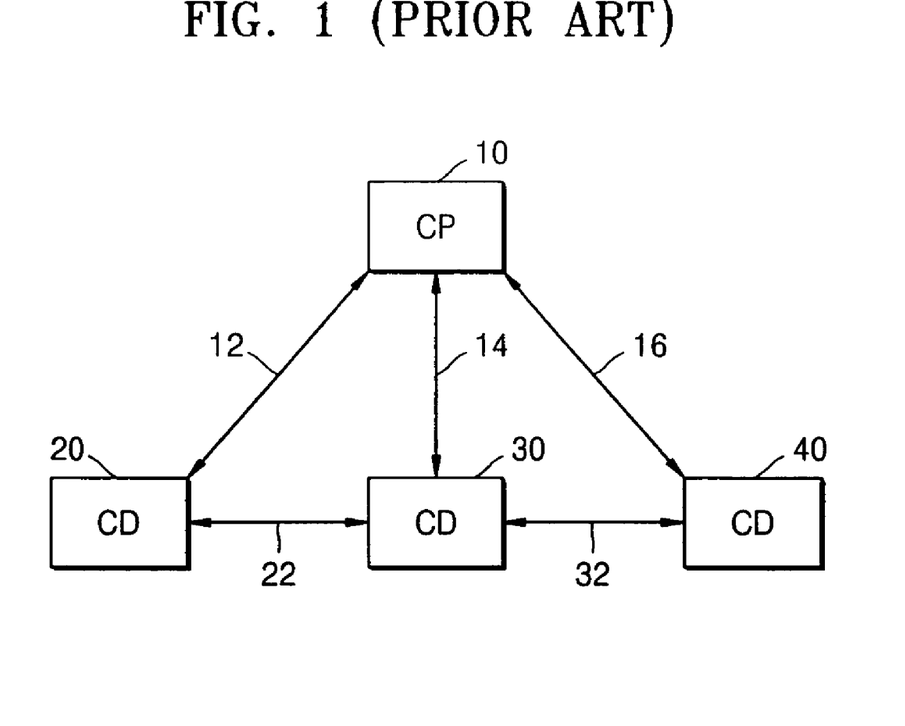
FIG. 1 is a diagram illustrating an uPnP protocol-based home network.

FIG. 1 is a diagram illustrating an uPnP protocol-based home network. Referring to FIG. 1, the uPnP protocol-based home network comprises control devices (CDs) 20, 30, and 40 and a control point (CP) 10.

The CP 10 searches the uPnP protocol-based home network for the CDs 20 through 40 and recognizes whether each of the CDs 20 through 40 is newly connected to the uPnP protocol-based home network by receiving an advertisement message from the corresponding CD. The advertisement message is generated when each of the CDs 20 through 40 is newly connected to or disconnected from the uPnP protocol-based home network. The CP 10 receives a description message from each of the CDs 20 through 40. Also, the CP 10 transmits and receives event messages associated with actions involving each of the CDs 20 through 40. Each action involving the CP 10 and each of the CDs 20 through 40 is defined by a markup language, for example, XML.

Each of the CDs 20 through 40 transmits an advertisement message to the CP 10 whenever it is connected to or disconnected from the uPnP protocol-based home network. Further, each of the CDs 20 through 40 periodically transmits a message to the CP 10 in order to confirm whether it still exists on the uPnP protocol-based home network. In addition, each of the CDs 20 through 40 responds to various requests issued by the CP 10 according to the uPnP protocol. Each of the CDs 20 through 40 may be either a media source or a media renderer. In FIG. 1, elements 12, 14, and 16 denote the transmissions of messages between the CP 10 and the CD 20, between the CP 10 and the CD 30, and between the CP 10 and the CD 40, respectively, and elements 22 and 32 denote the transmissions of contents between the CD 20 and the CD 30 and between the CD 30 and the CD 40, respectively.

As described above, each of the CDs 20 through 40 may be a media renderer, which reproduces content, or a media source, which provides the content to the media renderer. The media renderer generally has a recording function so that it can store content received from the media source in its recording medium. The media source may be a contents database or contents broadcast.

In a case where the media source broadcasts media content to the media renderer, the media renderer has two recording functions, i.e., a real-time recording function, which enables a user to manually record content when the content is broadcasted, and a scheduled recording function, which schedules recording of content to be broadcasted in the near future so that the content can be automatically recorded at scheduled recording time.

According to the manual and scheduled recording functions, it is determined whether to record content by determining whether the content is recordable based on copy control information defined in the content. The copy control information can be defined in various manners depending on which digital rights management a home network employs. One type of copy control information is "copy never", which only allows content to be reproduced by a media renderer and prevents the content from being copied to a recording medium in the media renderer.

Figure 2:
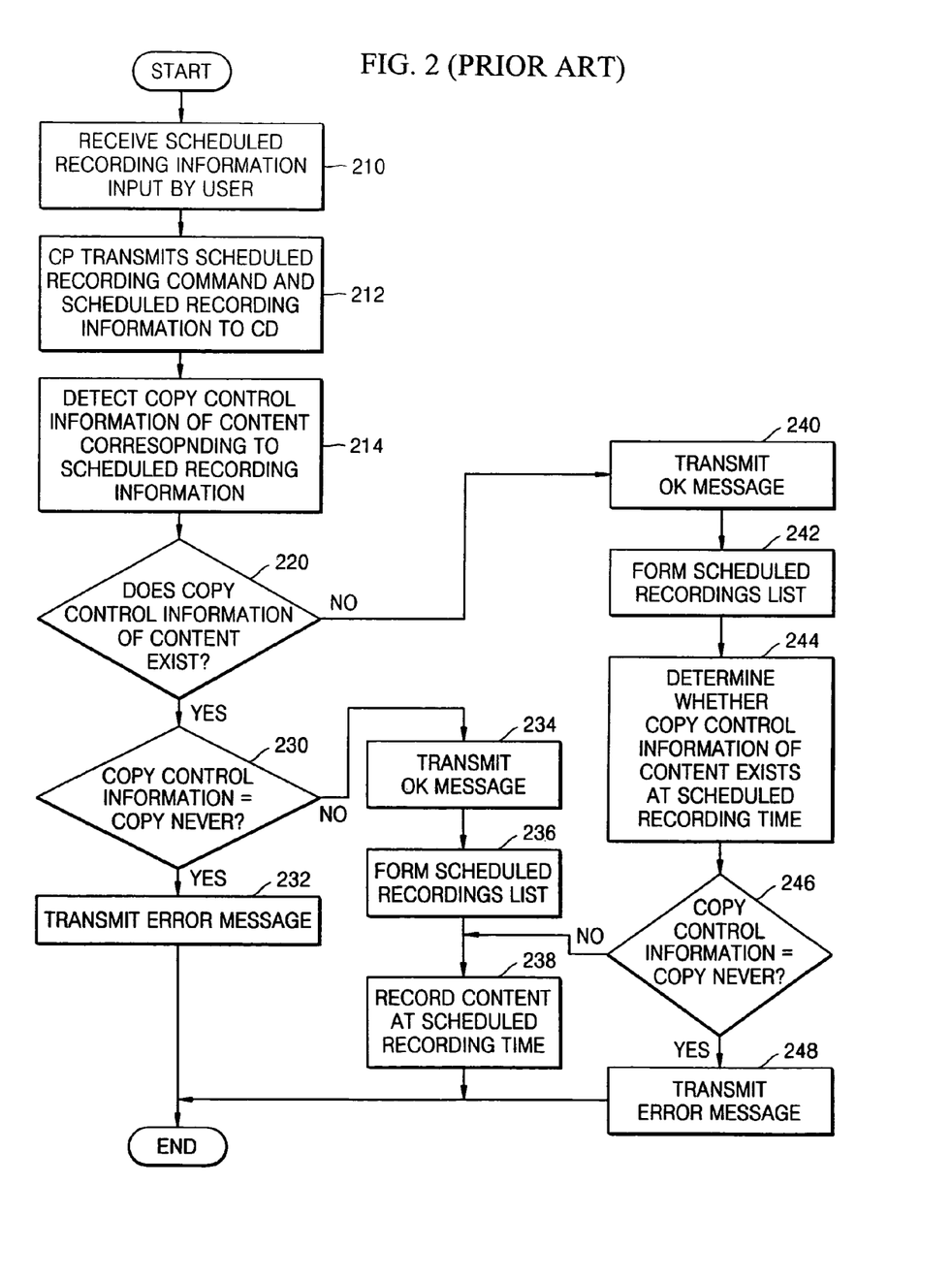
FIG. 2 is a flowchart of a conventional scheduled recording method.

FIG. 2 is a flowchart of a conventional scheduled recording method. Referring to FIG. 2, in operation 210, a user inputs scheduled recording information and a command to scheduled-record content to a CP. The CP may be a device having a user interface, such as a personal digital assistant (PDA), a personal computer, or a remote control device. The scheduled recording information is information necessary for scheduled-recording the content and includes scheduled recording start time, scheduled recording date, running time of the content, a channel, at which the content is to be broadcasted, the title of the content, and a recording type.

In operation 212, the CP transmits the scheduled recording information and the command to scheduled-record the content to a recording device, i.e., a CD (control device). The recording medium is a media renderer in a home network, which reproduces media content or stores the media content in its recording medium.

In operation 214, the CD determines whether the content has copy control information In operation 220, if the content has the copy control information, the method proceeds to operation 230, and otherwise, the method proceeds to operation 240.

In operation 240, the CD transmits a message indicating that the content is recordable to the CP, which may then inform the user. In general, the copy control information is periodically updated. Thus, the copy control information may not exist in the CD at the time when the CP transmits the command to schedule-record the content to the CD. It is impossible to determine whether the content is recordable if the copy control information does not exist in the CD. However, the CD transmits the message indicating that the content is recordable to the CD regardless of whether the content has the copy control information.

In general, the copy control information is included in an electronic program guide (EPG), and the EPG is updated every few hours or every few days. The EPG is provided by a media source.

In operation 242, a scheduled recordings list is formed based on the scheduled recording information of the content. The scheduled recordings list identifies the content, which is scheduled to be scheduled-recorded, and includes various information necessary for scheduled-recording the content, such as scheduled recording time.

In operation 244, the CD checks the copy control information of the content when the scheduled recording time has arrived. At the moment when the content is broadcasted, the copy control information of the content must exist in the CD.

In operation 246, if the copy control information of the content is "copy never", the method proceeds to operation 248, and otherwise, the method proceeds to operation 238.

In operation 248, if the copy control information of the content is "copy never", the CD transmits an error message indicating that the content cannot be recorded to the CP to notify the user, and the method is completed.

In operation 238, if the copy control information of the content is not "copy never", the content is recorded at the scheduled recording time according to the scheduled recordings list formed in operation 242.

If the content is determined to have the copy control information in operation 220, the method proceeds to operation 230. In operation 230, it is determined whether the content is recordable based on the copy control information. Thereafter, depending on whether the copy control information of the content is "copy never", the method may proceed to operation 232 or 234.

More specifically, if the copy control information of the content is "copy never", the CD transmits the error message to the CP, which may notify the user, in operation 232.

Otherwise, the CD transmits an OK message indicating that the content is recordable to the user in operation 234, forms a scheduled recordings list in operation 236, and records the content at the scheduled recording time according to the scheduled recordings list in operation 238.

According to the conventional method of scheduled-recording content, if copy control information of content of interest does not exist in a CD at any given moment or if the copy control information of the content of interest is "copy never", a user cannot realize that the content of interest is not recordable until scheduled recording time of the content of interest because he/she only can check the copy control information of the content of interest and then realize that the copy control information of the content of interest is "copy never" after the scheduled recording time of the content of interest.

Therefore, the user may not have much time to come up with how to deal with a failure to scheduled-record the content of interest and cannot take appropriate measures to obtain the content of interest on time.

SUMMARY OF THE INVENTION

The present invention provides a scheduled recording method, which allows a user to expect whether a scheduled recording of content will be successfully performed based on a copy protection status variable defined in the content.

According to an aspect of the present invention, there is provided a scheduled recording method, which is performed in a recording device in a home network and schedules recording of content whose copy control information is "copy never". The scheduled recording method involves (a) determining whether copy control information of content of interest exists in the recording device, the recording device storing various copy control information; (b) if the copy control information of the content of interest does not exist in the recording device, newly receiving copy control information and then determining whether the copy control information of the content of interest exists among the newly received copy control information; (c) if the copy control information of the content of interest exists in the recording device, determining whether the copy control information of the content of interest is "copy never"; and (d) if the copy control information of the content of interest is "copy never", transmitting an error message to a user, the error message indicating that the content of interest is not recordable to a user.

Operation (b) may involve (b1) if the copy control information of the content of interest does not exist in the recording device, setting a copy protection status variable of the content of interest to 'unknown', the copy protection status variable indicating whether the content of interest is recordable. Operation (b) may further involve (b2) if the copy protection status variable is set to 'unknown', determining whether the copy control information of the content of interest exists in the recording device whenever copy control information is newly input to the recording device.

The scheduled recording method may further involve (g) transmitting the error message to the user if the copy control information of the content of interest is determined to exist in the recording device in (a) and is determined to be "copy never" in (d).

According to another aspect of the present invention, there is provided a scheduled recording method, which is performed in a recording device in a home network and schedules recording of content whose copy control information is "copy never". The scheduled recording method involves (a) receiving scheduled recording information on content of interest, the scheduled recording information being input by a user; (b) if copy control information of the content of interest does not exist, setting a copy protection status variable of the content of interest to 'unknown', the copy protection status variable indicating whether the content of interest is recordable; (c) if the copy control information of the content of interest is determined to exist through the update of the copy control information, determining whether the copy control information of the content of interest is "copy never"; and (d) if the copy control information of the content of interest is "copy never", transmitting an error message to the user, the error message indicating that the content of interest is not recordable.

In this method, operation (b) may involve (b1) transmitting an OK message to the user, the OK message indicating that the recording of the content of interest has been successfully scheduled.

According to another aspect of the present invention, there is provided a computer-readable recording medium, on which a program enabling the scheduled recording method is recorded.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Exemplary embodiments of the present invention will now be described more fully with reference to the accompanying drawings.

Figure 3:
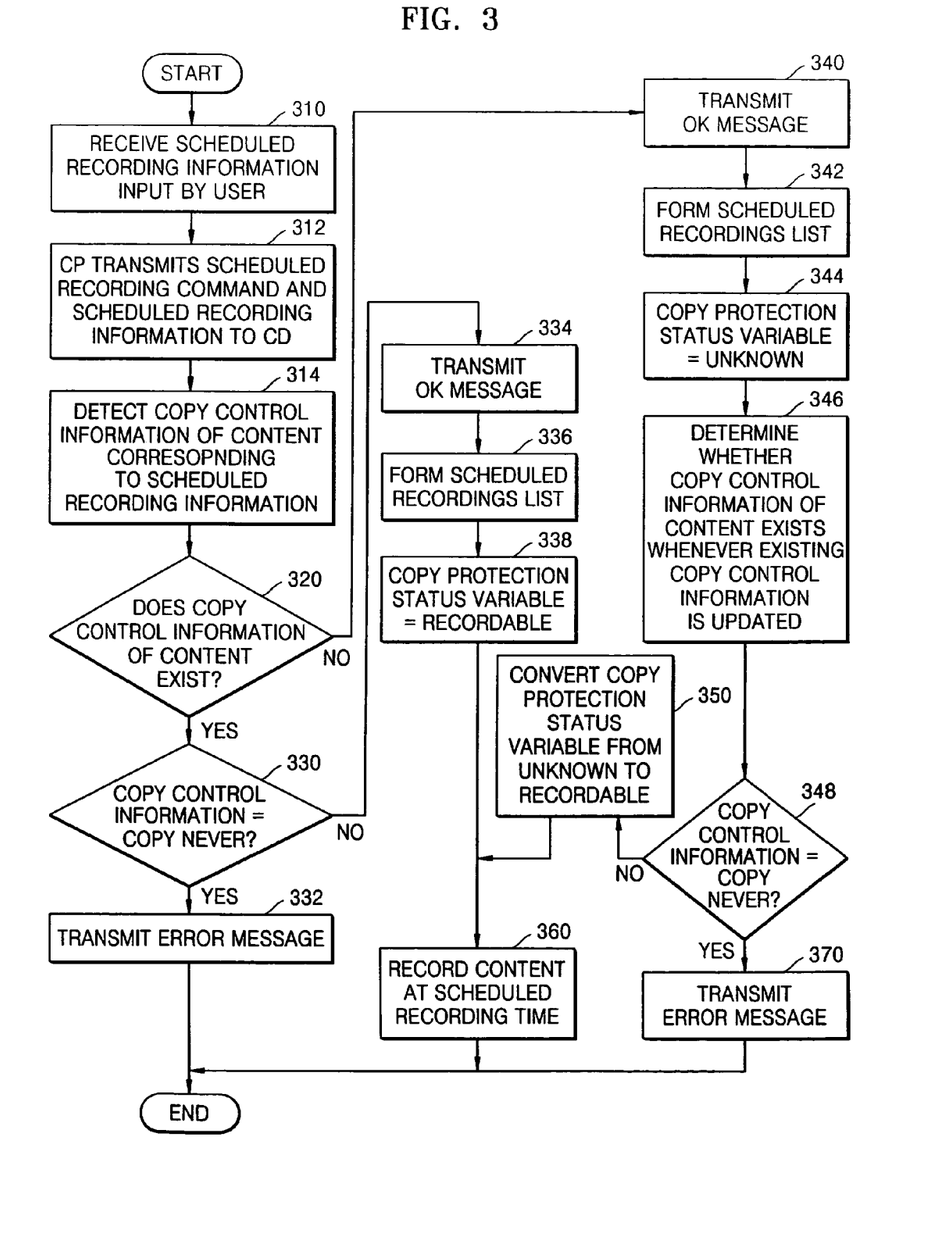
FIG. 3 is a flowchart of a scheduled recording method according to an exemplary embodiment of the present invention.

FIG. 3 is a flowchart of a scheduled recording method according to an exemplary embodiment of the present invention. Referring to FIG. 3, in operation 310, a user inputs scheduled recording information and a command to scheduled-record content to a CP. The CP may be a device having a user interface, such as a personal digital assistant (PDA), a personal computer, or a remote control device. The scheduled recording information is information necessary for scheduled-recording the content and includes scheduled recording start time, scheduled recording date, running time of the content, a channel, at which the content is to be broadcasted, the title of the content, and a recording type.

In operation 312, the CP transmits the scheduled recording information and the command to scheduled-record the content to a recording device, i.e., a CD. The recording medium is a media renderer in a home network that reproduces media content or stores the media content in its recording medium.

In operation 314, the CD determines whether the content has copy control information In operation 320, if the content has the copy control information, the method proceeds to operation 330, and otherwise, the method proceeds to operation 340.

In operation 340, the CD transmits a message indicating that the content is recordable to the CP, which may notify the user. In general, the copy control information is periodically updated. Thus, the copy control information may not exist in the CD at the time when the CP transmits the command to schedule-record the content to the CD. It is impossible to determine whether the content is recordable if the copy control information does not exist in the CD. However, the CD transmits the message indicating that the content is recordable to the CD regardless of whether the content has the copy control information.

In general, the copy control information is included in an electronic program guide (EPG), and the EPG is updated every few hours or every few days. The EPG is provided by a media source.

In operation 342, a scheduled recordings list is formed based on the scheduled recording information of the content. The scheduled recordings list identifies the content, which is scheduled to be scheduled-recorded, and includes various information necessary for scheduled-recording the content, such as scheduled recording time.

In operation 344, the CD defines a copy protection status variable indicating whether the content is recordable, and sets the copy protection status variable to 'unknown'. The copy protection status variable may be included in the scheduled recording list.

In operation 346, the CD determines whether the copy control information of the content exists whenever it receives new copy control information.

The CP may periodically transmit a polling message to the CD, and the CD may determine whether it receives the copy control information of the content whenever it receives the polling message from the CP.

If the content is determined to have the copy control information in operation 348, the CD determines whether the copy control information of the content is "copy never". If the copy control information of the content is "copy never", the method proceeds to operation 370, and otherwise, the method proceeds to operation 350.

In operation 350, the CD converts the copy protection status variable from 'unknown' to 'recordable', and the method proceeds to operation 360.

In operation 360, if the copy control information of the content is not "copy never", the content is recorded at the scheduled recording time according to the scheduled recordings list formed in operation 342.

In operation 370, if the copy control information of the content is "copy never", the CD transmits an error message indicating that the content cannot be recorded to the CP, which may notify the user, and the method is completed.

If the content is determined to have the copy control information in operation 320, the method proceeds to operation 330.

In operation 330, the CD determines whether the copy control information of the content is "copy never".

In operation 332, if the copy control information of the content is determined to be "copy never" in operation 330, the CD transmits the error message to the user, i.e., the CP, and the method is completed.

If the copy control information of the content is determined not to be "copy never", the content is recorded at the scheduled recording time in operations 334 through 360.

More specifically, the CD transmits an OK message indicating that the content is recordable to the user in operation 334, forms a scheduled recordings list in operation 336, converts the copy protection status variable from 'unknown' to 'recordable, and records the content at the scheduled recording time according to the scheduled recordings list in operation 338.

In the present embodiment, if the copy control information of the content is determined to be "copy never", the CD transmits the error message to the CP without generating the copy protection status variable, and the entire scheduled recording method is completed. Even if the copy protection status variable is generated, the content cannot be recorded at the scheduled recording time unless the copy protection status variable is set to 'recordable'.

In addition, the OK message and the error message can be realized as uPnP protocol-based event messages transmitted between the CP and the CD.

Moreover, the copy control information of the content can be obtained from an EPG.

Furthermore, in a case where the content is an MPEG transport stream, the copy control information of the content can be obtained from a program mapping table or transport stream packet header.

Figure 4:
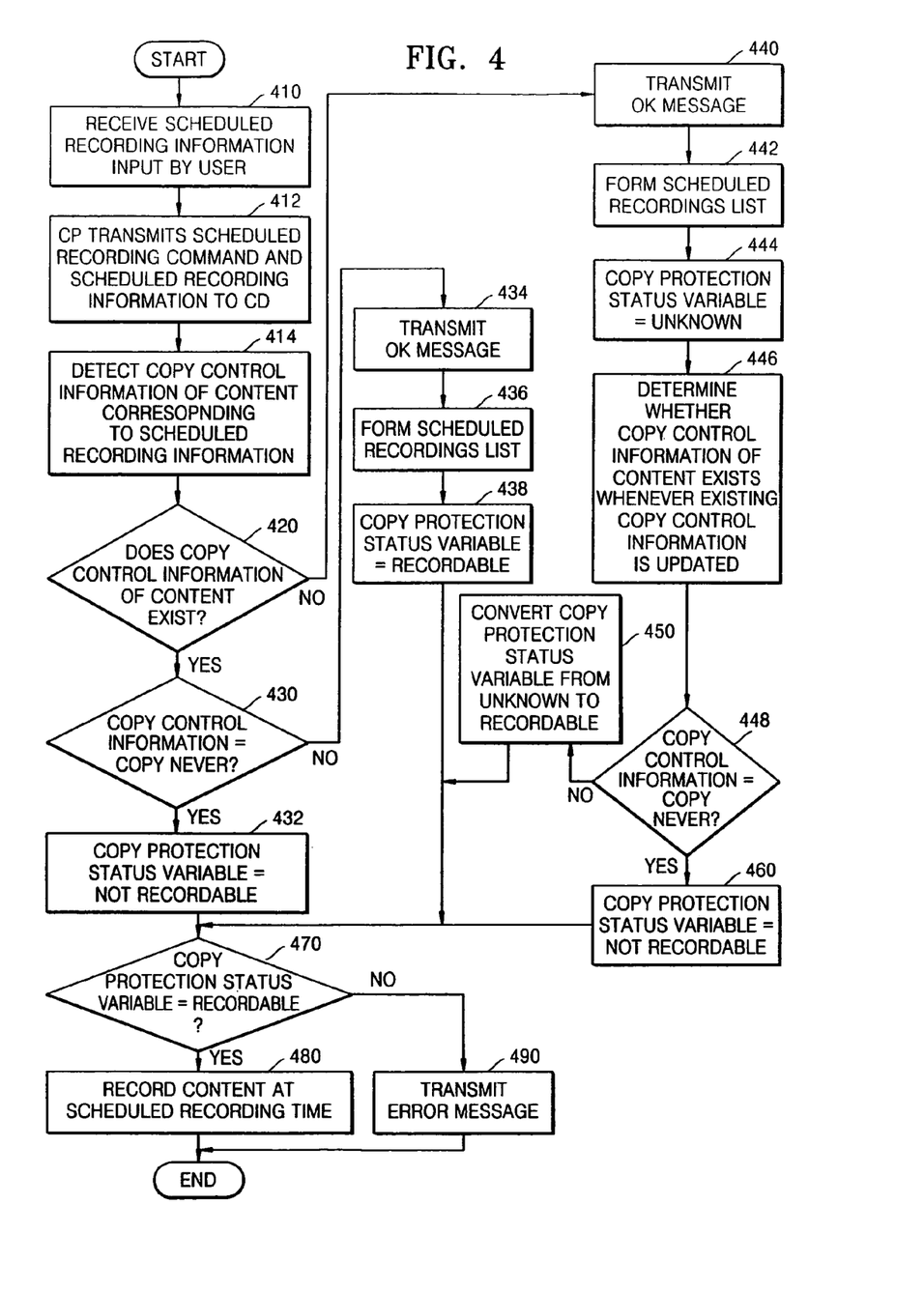
FIG. 4 is a flowchart of a scheduled recording method according to another exemplary embodiment of the present invention.

FIG. 4 is a flowchart of a scheduled recording method according to another exemplary embodiment of the present invention. Referring to FIG. 4, operations 410 through 420 are the same as operations 310 through 320 of FIG. 3, and operations 434 through 438 are the same as operations 334 through 338 of FIG. 3.

If copy control information of content is determined to be "copy never" in operation 430, a CD sets a copy protection status variable defined in the content to 'not recordable' in operation 432, which is different from operation 332 of FIG. 3 in which the CD would transmit an error message to a user.

Operations 440 through 448 are the same as operations 340 through 348 of FIG. 3.

If the copy control information of the content is determined to be "copy never" in operation 448, the CD sets the copy protection status variable to 'not recordable' in operation 460, which is different from operation 370 of FIG. 3 in which the CD would transmit the error message to the CP, which may inform the user. However, if the copy control information of the content is determined not to be copy never, the copy protection status variable is converted from unknown to 'recordable' in operation 450.

In operation 470, the CD determines whether the copy protection status variable of the content is set to 'recordable'.

If the copy protection status variable of the content is set to 'recordable', the CD records the content at the scheduled recording time according to a scheduled recordings list, formed in operation 436 or 442, in operation 480.

If the copy protection status variable of the content is not set to 'recordable', the CD transmits the error message to the CP, which may inform the user, in operation 490 and the method is completed.

Figure 5:
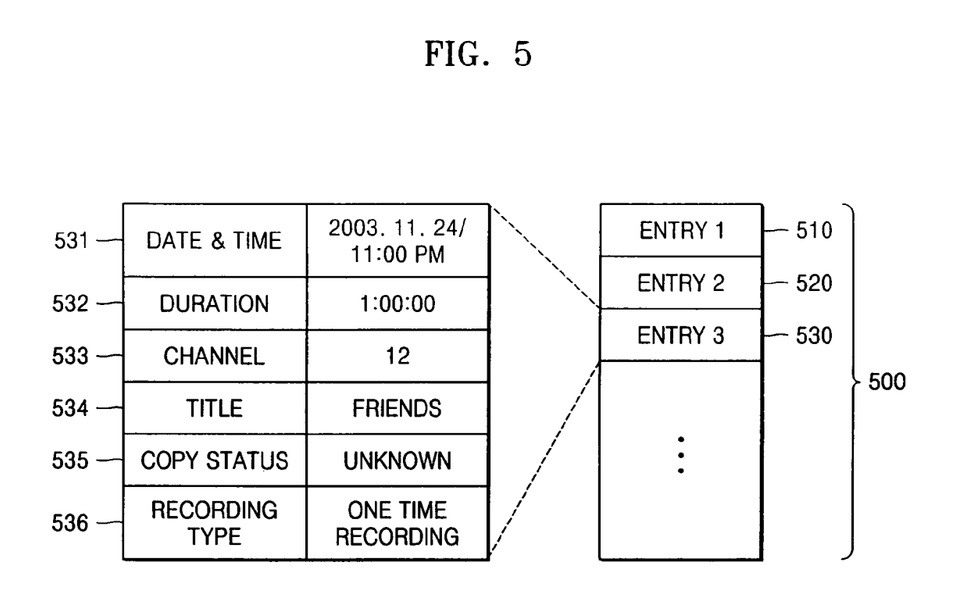
FIG. 5 is diagram illustrating a scheduled recordings list.

FIG. 5 is a diagram illustrating a scheduled recordings list 500. Referring to FIG. 5, the scheduled recordings list 500 includes at least one scheduled entry, i.e., entries 510, 520, 530, .... The entries 510, 520, 530, ... one-on-one correspond to contents scheduled to be recorded. Each of the entries 510, 520, 530, ... includes at least one reservation information, i.e., scheduled recording start time and date 531, duration 532, which specifies the running time of corresponding content, channel 533, which specifies a channel at which the corresponding content is to be broadcasted, title 534, which specifies the title of the corresponding content, copy protection status variable 535, and recording type 536. A CD searches the scheduled recording list for content of interest and then records the content of interest at scheduled recording time of the content of interest.

In the exemplary embodiment of the present method, unlike in the prior art, the at least one reservation information of each of the entries 510, 520, 530, ... of the scheduled recording list 500 further includes copy protection status variable 535. A copy protection status variable is a variable indicating whether corresponding content is currently recordable and can be updated afterwards.

For example, supposing that an EPG contains two weeks of contents and the respective copy control information, and content of interest will be broadcasted over one month from now, a user cannot determine whether the content of interest is recordable for now. Thus, a copy protection status variable for the content of interest is set to 'unknown'. Thereafter, if the EPG is updated so that copy control information of the content of interest can be newly included therein, the copy protection status variable is updated based on the copy control information of the content of interest.

The scheduled recording method according to the exemplary aspects of the present invention can be realized as a computer program. Codes and code segments of the computer program can be easily derived from the prior art by those skilled in the art. The computer program can be stored in a computer-readable recording medium or can be read or executed by a computer so that the scheduled recording method according to the present invention can be realized. The computer-readable recording medium includes a magnetic recording medium, an optical recording medium, and a carrier wave.

As described above, according to the exemplary aspects of the present invention, it is possible to let a user know about whether content of interest is recordable by defining a copy protection status variable in the content and determining whether the content of interest is recordable whenever new copy control information is received.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scheduled recording method, which is performed in a recording device in a home network and schedules recording of content, the scheduled recording method comprising:
   (a) determining whether copy control information of content of interest exists in the recording device, the recording device various copy control information;
   (b) if the copy control information of the content of interest is determined not to exist in the recording device, newly receiving copy control information and determining whether the copy control information of the content of interest exists among the newly received copy control information;
   (c) if the copy control information of the content of interest is determined to exist in the recording device, determining whether the copy control information of the content of interest is "copy never"; and
   (d) if the copy control information of the content of interest is "copy never", transmitting an error message to a user, the error message indicating that the content of interest is not recordable to the user.

2. The scheduled recording method of claim 1, wherein (b) comprises:
   (b1) if the copy control information of the content of interest does not exist in the recording device, setting a copy protection status variable of the content of interest to 'unknown', the copy protection status variable indicating whether the content of interest is recordable; and
   (b2) if the copy protection status variable is set to 'unknown', determining whether the copy control information of the content of interest exists in the recording device whenever copy control information is newly input to the recording device.

3. The scheduled recording method of claim 2 further comprising converting the copy protection status variable from 'unknown' to 'recordable' if the copy control information of the content of interest is determined not to be "copy never" in (c).

4. The scheduled recording method of claim 2 further comprising setting the copy protection status variable to 'recordable' or 'not recordable' based on the copy control information of the content of interest if the copy control information of the content of interest is determined to exist in the recording device in (a).

5. The scheduled recording method of claim 1 further comprising transmitting the error message to the user if the copy control information of the content of interest is determined to exist in the recording device in (a) and is determined to be "copy never" in (d).

6. A scheduled recording method, which is performed in a recording device in a home network and schedules recording of content, the scheduled recording method comprising:
- (a) receiving scheduled recording information on content of interest, wherein the scheduled recording information is input by a user;
- (b) if copy control information of the content of interest does not exist, setting a copy protection status variable of the content of interest to 'unknown', wherein the copy protection status variable indicates whether the content of interest is recordable;
- (c) if the copy control information of the content of interest is determined to exist through an update of the copy control information, determining whether the copy control information of the content of interest is "copy never"; and
- (d) if the copy control information of the content of interest is "copy never", transmitting an error message to the user, wherein the error message indicates that the content of interest is not recordable.

7. The scheduled recording method of claim 6, wherein (b) comprises transmitting an OK message to the user, the OK message indicating that the recording of the content of interest has been successfully scheduled.

8. The scheduled recording method of claim 7 further comprising converting the copy protection status variable to 'recordable' if the copy control information of the content of interest is determined not to be "copy never" in (c).

9. The scheduled recording method of claim 8 further comprising generating a scheduled recordings list based on the scheduled recording information and the copy protection status variable of the content of interest, the scheduled recordings list containing information necessary for scheduled-recording the content of interest.

10. The scheduled recording method of claim 9 further comprising recording the content of interest at a predetermined scheduled recording time according to the scheduled recordings list.

11. The scheduled recording method of claim 6 further comprising transmitting the error message to the user if the copy control information of the content of interest is "copy never".

12. The scheduled recording method of claim 6 further comprising transmitting an OK message to the user if the copy control information of the content of interest is not "copy never", the OK message indicating that the content of interest is recordable.

13. The scheduled recording method of claim 6 further comprising converting the copy protection status variable to 'recordable'.

14. The scheduled recording method of claim 13 further comprising generating a scheduled recordings list based on the scheduled recording information and the copy protection status variable of the content of interest, the scheduled recordings list containing information necessary for scheduled-recording the content of interest.

15. The scheduled recording method of claim 14 further comprising recording the content of interest at predetermined scheduled recording time according to the scheduled recordings list.

16. The scheduled recording method of claim 6, wherein the scheduled recording information comprises at least one of a scheduled recording date and time, a running time of the content of interest, a channel on which the content of interest is to be broadcast, a title of the content, and a recording type or any combinations thereof.

17. The scheduled recording method of claim 6, wherein the copy control information is obtained from an electronic program guide (EPG).

18. The scheduled recording method of claim 6, wherein the content of interest is an MPEG transport stream, and the copy control information thereof is obtained from a program mapping table or a transport stream packet header.

19. A computer-readable storage medium storing a scheduled recording method, which is performed in a recording device in a home network and schedules recording of content, the scheduled recording method comprising:
- (a) determining whether copy control information of content of interest exists in the recording device, wherein the recording device storing various copy control information;
- (b) if the copy control information of the content of interest is determined not to exist in the recording device, newly receiving copy control information and determining whether the copy control information of the content of interest exists among the newly received copy control information;
- (c) if the copy control information of the content of interest is determined to exist in the recording device, determining whether the copy control information of the content of interest is "copy never"; and
- (d) if the copy control information of the content of interest is "copy never", transmitting an error message to a user, the error message indicating that the content of interest is not recordable to a user.

* * * * *

UNITED STATES PATENT AND TRADEMARK OFFICE
CERTIFICATE OF CORRECTION

PATENT NO.        : 7,603,722 B2                                                          Page 1 of 1
APPLICATION NO.   : 11/104497
DATED             : October 13, 2009
INVENTOR(S)       : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this

Fifth Day of October, 2010

David J. Kappos
*Director of the United States Patent and Trademark Office*